United States Patent [19]

Harada et al.

[11] Patent Number: 4,576,563
[45] Date of Patent: Mar. 18, 1986

[54] ROTARY ROLL-TYPE RUBBER EXTRUDER

[75] Inventors: Jumei Harada, Kodaira; Keiji Yamamoto, Tokorozawa; Takashi Yokoi, Kodaira, all of Japan

[73] Assignee: Bridgestone Corporation, Tokyo, Japan

[21] Appl. No.: 681,752

[22] Filed: Dec. 14, 1984

[30] Foreign Application Priority Data

Dec. 21, 1983 [JP] Japan ............................... 58-239682

[51] Int. Cl.$^4$ ............................................. B21C 23/32
[52] U.S. Cl. .................................. 425/194; 425/224; 425/376 B
[58] Field of Search ............ 425/194, 224, 374, 376 B, 425/381.2; 264/175

[56] References Cited

U.S. PATENT DOCUMENTS

| | | | |
|---|---|---|---|
| 2,277,313 | 3/1942 | Fowler | 425/194 |
| 2,892,212 | 6/1959 | Rhodes | 425/374 X |
| 3,270,107 | 8/1966 | Bailey et al. | 264/175 X |
| 3,765,216 | 10/1973 | Green | 425/224 X |
| 3,956,056 | 5/1976 | Boguslawski et al. | 425/224 X |
| 4,156,752 | 5/1979 | Riccitiello et al. | 264/175 X |
| 4,163,377 | 8/1979 | Moreau | 425/224 X |
| 4,205,951 | 6/1980 | Sollich | 425/374 X |
| 4,408,974 | 10/1983 | Comerio | 425/224 X |

*Primary Examiner*—J. Howard Flint, Jr.

*Attorney, Agent, or Firm*—Sughrue, Mion, Zinn, Macpeak and Seas

[57] ABSTRACT

A rotary roll-type rubber extruder including a roll having an outer cylindrical surface rotatively driven by driving means, a housing having a stationary concave surface spaced from and in opposition to the rotating outer cylindrical surface of said roll between a pair of sidewalls close to the outer cylindrical surface of the roll to form a define chamber with the roll, and a mouthpiece detachably secured to the housing to form a defined extruding opening with the roll at an outlet of the defined chamber.

The concave surface of the housing is determined such that pressure gradients at mouthpieces are within a quadrilateral area having four corners corresponding to pressure gradients 65 and 150 kg/cm$^3$ at a 1 mm opening mouthpiece and pressure gradients 11 and 23 kg/cm$^3$ at a 5 mm opening mouthpiece in a graph having an ordinate in logarithm showing the pressure gradients $$\left( -\frac{dP}{dX} \right)$$

and an abscissa in logarithm showing heights mm of openings of the mouthpieces.

4 Claims, 12 Drawing Figures

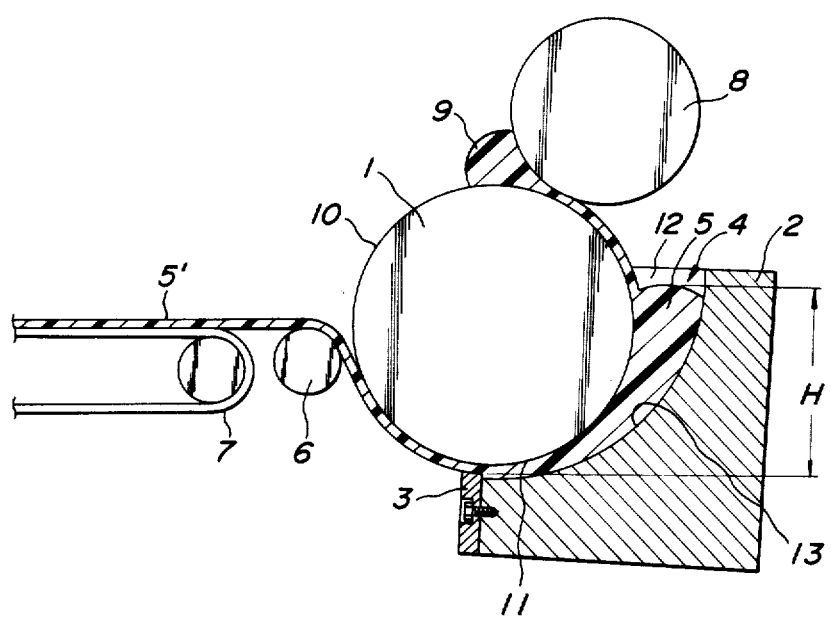
FIG_1

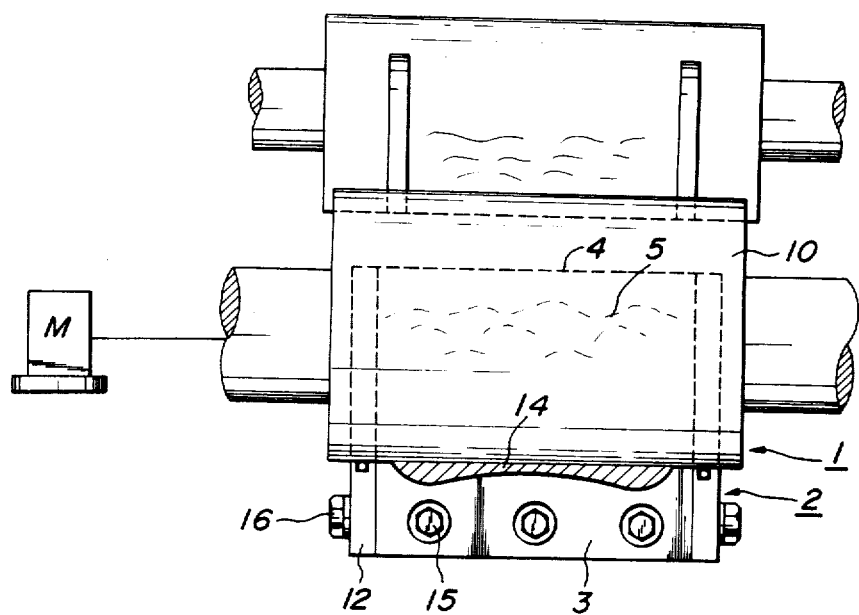
FIG_2
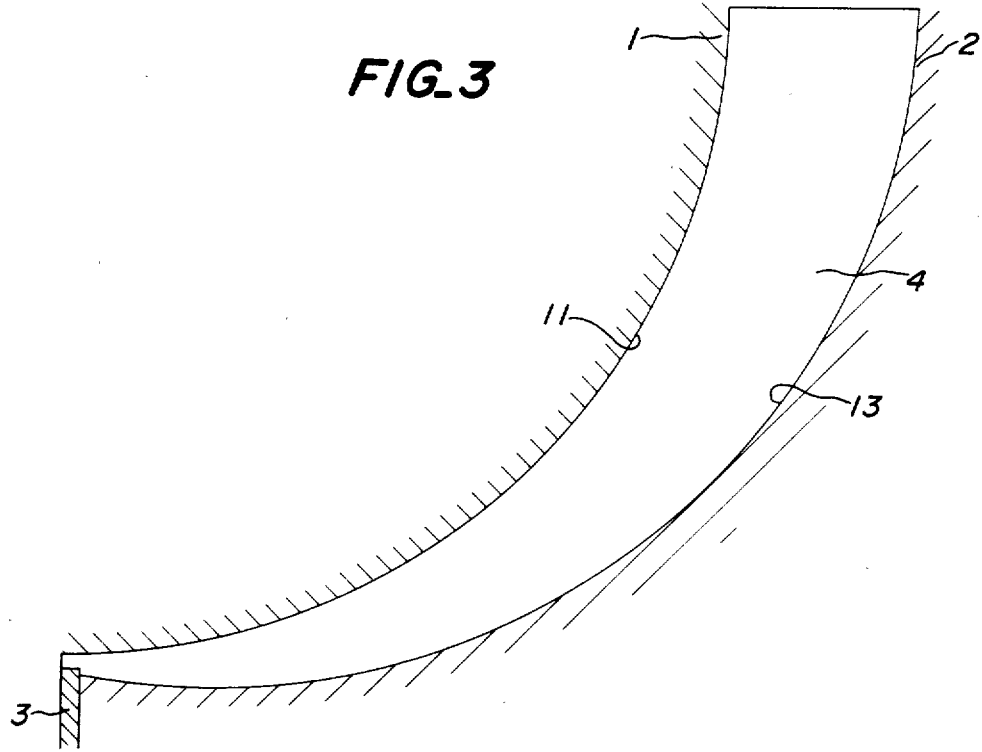
FIG_3

FIG_4
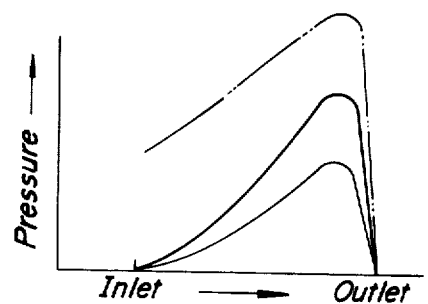
FIG_5
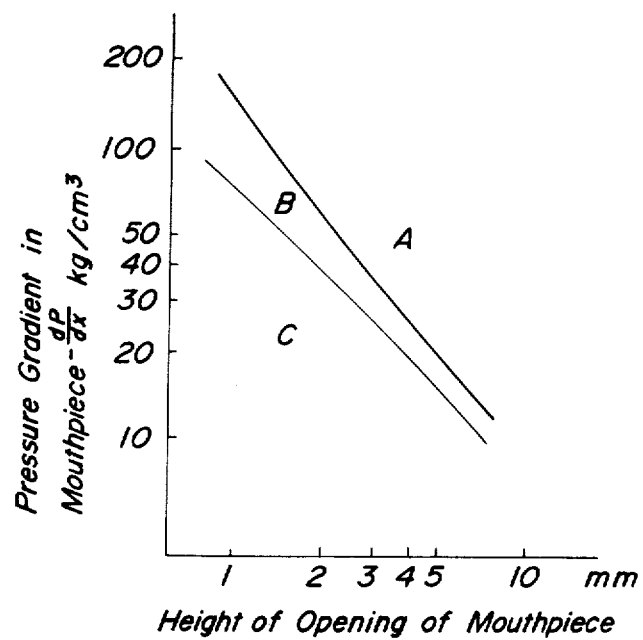

ROTARY ROLL-TYPE RUBBER EXTRUDER

BACKGROUND OF THE INVENTION

1. Field of the Invention

This invention relates to a rotary roll-type rubber extruder for continuously extruding a rubber or rubber-like material, for example, a thermoplastic material, particularly rubber members such as rubber sheets required to form treads, sidewalls, rubber chafers, inner liners and the like by joining the rubber sheets into cylindrical forms.

2. Description of the Prior Art

In extruding rubbers or rubberlike materials, there is generally a tendency of the materials to expand in cross-section immediately after the extrusion. This is usually referred to as "swell" and further causes great shrink of the materials in the extruded direction. A new proposal has been therefore expected for many years, which is capable of producing ideal extruded rubberlike material which does not include residual strains and has high accuracy relative to a shape of a mouthpiece.

Screw-type extruders have also been widely used. Such a screw-type extruder comprises a screw extruding assembly provided on its front end with an die head having at an outlet a mouthpiece. Rubbers extruded from this type extruder are greatly likely to cause the swell, and often to cause tears in the form of saw-teeth in their side edges. These defects of the extruded rubbers make difficult design of mouthpieces.

A profile calender system has also been known, which comprises two parallel rolls, one of which is formed in its cylindrical surface with a notch to form with the other roll an opening corresponding to a predetermined section or contour of rubbers to be extruded. As disclosed in the literature, however, this system also tends to cause swells and extruded rubbers are likely to deform after they are extruded due to local differences in extruding speed resulting from differences in rotating radii of the rolls where the opening is formed. Moreover, the rolls used in this system are expensive to manufacture and troublesome to replace.

U.S. Pat. No. 3,871,810 discloses an improved screw-type extruder which comprises a single roller die disposed at a front end of a screw extruding assembly to increase pressure at an outlet of the roller die and emphasizes the effects of the improved extruder. However, it implies the following problems.

(1) Swells still occur and contours of mouthpieces must be determined by trial and error.
(2) Natures and configurations of extruded rubbers are changed depending upon changes in extruding speed and rubber.
(3) Dimensions of the extruded rubbers are affected by the variation in amount of extruded rubber on the side of the screw extruding assembly.
(4) Extruded members often locally shrink and curve to obstruct a later tire building process.
(5) There is a tendency for the rubber to be scorched in the die head.
(6) In changing rubber materials to be extruded, troublesome and time-consuming work is required to remove residual rubber in the die head.

In order to solve the problems (2) and (4), particularly, the extruded rubbers must be forcedly extended and shrinked by setting complicated line speeds. For this purpose, however, it is required to provide additional installations and to elongate a length of conveyor line in the extruding train following to the extruding process or make the conveyor line into a multiple stage line.

SUMMARY OF THE INVENTION

This invention resides in a discovery that all the above disadvantages can be removed by particular features obtained from inventor's investigation and various experiments on flowing rubber materials with respect to reasons causing the difference in shape between the mouthpiece and extruded rubber and causing local shrinkage and bending of the extruded rubber.

It is an object of the invention to provide an improved rotary roll-type rubber extruder which eliminates a correcting operation in forming a mouthpiece by making the difference in shape between the mouthpiece and extruded rubbers as small as possible, and by removing effect of extruding speed and that of rubber material.

It is another object of the invention to provide a rotary roll-type rubber extruder capable of extruding rubbers which do not locally bend and warp and hardly shrink in their length to remove any trouble in forming process by eliminating the cause of local shrinkage in the extruded rubbers.

It is a further object of the invention to provide a rotary roll-type rubber extruder which eliminates complicated setting of conditions and complicated operation for releasing strains in extruded rubbers in an elongated or multiple stage conveyor line in an extruding train.

These objects can be achieved by the rotary roll-type rubber extruder according to the invention including a roll having an outer cylindrical surface rotatively driven by driving means, a housing having a stationary concave surface speed from and in opposition to the rotating outer cylindrical surface of said roll between a pair of sidewalls close to said outer cylindrical surface of the roll to form a define chamber with the roll, and a mouthpiece detachably secured to said housing to form a defined extruding opening with said roll at an outlet of said defined chamber, wherein said concave surface of said housing is constructed such that with a rubberlike material being supplied with the same rubberlike material to meet amounts of the material extruded from said mouthpiece under action of the atmospheric pressure at an inlet of said defined chamber opposite to said mouthpiece, pressure gradients at mouthpieces in extruding the rubberlike material having thicknesses of 1–5 mm are within a quadrilateral area having four corners, said corners corresponding to pressure gradients 65 and 150 (kg/cm$^3$) at a 1 mm opening mouthpiece and pressure gradients 11 and 23 (kg/cm$^3$) at a 5 mm opening mouthpiece in a graph having an ordinate in logarithm showing the pressure gradients $$\left( -\frac{dP}{dX} \right)$$

and an abscissa in logarithm showing heights (mm) of openings of the mouthpieces.

In another aspect of the invention, instead of using the pressure gradients at the mouthpiece, the maximum pressures in the proximity of the mouthpiece in extruding a rubberlike material having thickness of 1–5 mm are within a quadrilateral area having four corners, said corners corresponding to the maximum pressures 33 and 86 (kg/cm$^2$) in the proximity of a 1 mm opening mouthpiece and the maximum pressures 8 and 26 (kg/cm$^2$) in the proximtiy of a 5 mm opening mouthpiece in a graph having an ordinate showing the pressures P (kg/cm$^2$) and an abscissa showing heights (mm) of openings of the mouthpieces.

The invention will be more fully understood by referring to the following detailed specification and claims taken in connection with the appended drawings.

BRIEF DESCRIPTION OF THE DRAWINGS

FIG. 1 is a sectional view of an extruder according to the invention;

FIG. 2 is a front elevation of the extruder shown in FIG. 1;

FIG. 3 is a sectional view of a defined chamber of the extruder shown in FIG. 1;

FIG. 4 is a graph illustrating pressure distributions in rubbers to be extruded;

FIG. 5 is a graph illustrating suitable and unsuitable areas for extruding dependent upon heights of openings of mouthpieces;

DETAILED DESCRIPTION OF THE PREFERRED EMBODIMENT

Figure 6:
FIG. 6 is a front view of a mouthpiece used in an experiment for the invention.

Referring to FIGS. 1 and 2 illustrating one embodiment of the invention, a rotary roll-type rubber extruder comprises a roll 1, a housing 2 forming with the roll 1 a defined chamber 4 to be supplied with a rubber material 5, a mouthpiece 3, a separating roller 6 for separating an extruded rubber 5' from the roll 1, a take-out conveyor line 7 for transferring the extruded rubber 5', and a feed roll 8 for feeding a roll bank 9 into the defined chamber 4 between the roll 1 and the housing 2.

The roll 1 comprises an outer cylindrical surface 10, when rotating, which serves to extrude the rubber material 5 in the defined chamber 4 through a contour or opening of the mouthpiece 3 with the aid of a friction of the rubber material 5 due to its viscosity. The roll 1 is preferably driven by a variable speed motor M. The outer cylindrical surfce 10 may be of a barrel shape (positive crowning) or a constricted shape (progressively reducing diameters from ends to a mid portion, negative crowning) or tapered in its longitudinal axis, other than a straight cylindrical as shown.

The housing 2 comprises a pair of sidewalls 12 spaced in the longitudinal direction of the roll 1, which are in tightly sealing contact with a circumference surface of the roll 1 at its rotating surface areas 11 over one fourth of its circumferential surface (FIG. 2). The housing 2 further comprises a stationary concaved surface 13 between the pair of sidewalls 12 in opposition to the rotating surface areas 11 to form the defined chamber 4 having its upper end opened to the atmosphere and surrounded by the rotating surface areas 11, the sidewalls 12 and the concaved surface 13 as shown in the drawing.

The mouthpiece 3 for closing a lower end of the defined chamber 4 is detachably secured to the housing 2 by means of bolts 15 so as to be exchanged according to required contours 14 of mouthpieces 3. A reference numeral 16 denotes set screws for securing the sidewalls 12 to the housing 2.

In an experiment, with various changes in shape of the defined chambers and contours of the mouthpieces, the inventors measured, with pressure sensors located on the surface of the roll, inner pressure distributions in the rubber material 5 supplied in succession into the defined chamber 4 formed by the rotating surface 11 of the roll 1 and the concaved surface 13 of the housing 2.

As shown in FIG. 4 illustrating one example of results of the experiment, the thinner or lower the height of openings of mouthpieces, the higher is the maximum pressure in the proximity of an outlet of the mouthpiece 3 as shown by a thick solid line in FIG. 4. In contrast herewith, the thicker or higher the height of the openings of the mouthpieces, the lower is the maximum pressure in the proximity of an outlet of the mouthpiece 3 as shown by a thin solid line in FIG. 4. Moreover, absolute values of pressure gradients $$\left( -\frac{\partial P}{\partial X} \right)$$

around the mouthpiece are much higher in the case of thinner size of mouthpieces than those in thicker size of mouthpieces.

FIG. 5 is a graph of the pressure gradient as ordinate and the height of the opening of the mouthpieces as abscissa for the purpose of studying the effect of the height of opening of the mouthpiece on the contours of extruded rubbers under various pressures. In this case, widths of the openings of the mouthpieces were constant and the heights of the openings were 1-7 mm. Extruding speeds of the rubber were constant 40 m/min.

In an area A above and on the right side of a thick solid line in FIG. 5, when the flow of the rubber material increases and the material 5' is extruded at a speed equal to a circumferential speed of the roll 1, excess swells of the material occur. It is conceivable to prevent the excess swell by increasing the taking-out speed of the conveyor line. As the result, however, the extruded material 5' is elongated to change its width and length on the conveyor line 7 resulting in possibly increased irregularities in size in later processing.

In an area C below and on the left side of a thin solid line in FIG. 5, on the other hand, when the flow amount of the rubber is insufficient, the extruding speed of the material 5' is decreased to meet the flow amount of the material, thereby enabling the swells of the material to be eliminated. In this case, however, the extruded material 5' becomes unstable.

In an area B between the thick and thin solid lines in FIG. 5, when the material 5' is extruded at a speed equal to the circumferential speed of the rotating roll 1, a ratio of a height of the opening of the mouthpiece 3 to a thickness of the extruded material 5' is within 0.9-1.1, so that swell is, in fact, permissible, and the shrink and changes in width are not caused in the extruded material, and warping and bending of the material do not occur. It is clearly evident that the area B is optimum in the relation between the opening of the mouthpiece and the pressure gradient.

In this connection, a two dot-and-dash line in FIG. 4 illustrates a pressure behavior when the defined chamber 4 is connected to a screw type extruder. In this case, the relation between the pressure gradient and the size of the mouthpiece lies in the area A in FIG. 5, so that the obtained result was not suitable. Moreover, the height of the opening of the mouthpiece generally changes in the direction of the width of the extruded rubber material and its distribution of the height in the direction of the width changes in various manner (FIG. 2). Such differences in height of the opening of the mouthpiece give rise to differences in extruding speed at areas extending over the areas A and B or B and C deviating from the area B in FIG. 5 to cause differences in elongated extent locally in the extruded rubber material 5'. The local differences in elongated extent of the extruded rubber material 5' further gives rise to local differences in shrinkage in the material and cause the deformations therein.

It is therefore, important, to bring the relation between the pressure gradient and the opening of the mouthpiece into the area B in FIG. 5 in order to prevent the swells or deformations of the extruded rubber material 5'.

It is clearly evident from FIG. 5 that when the size of the opening of the mouthpiece is thin, the allowable area of the pressure gradient is relatively wide, while the thicker the size of the opening, the smaller is the pressure gradient and the narrower is the allowable area of the pressure gradient.

The area B of course varies with the materials supplied into the defined chamber 4 and the extruding speeds dependent upon the rotating speeds of the roller 1. In the event that the viscosity of the rubber rises for example 10%, however, the area B is only raised substantially 10% along the ordinate in FIG. 5 for all the mouthpieces. It is because in case of treating a rubber or rubberlike material as a power-law fluid, the power-law index is substantially constant for almost all the rubber compounds. Moreover, when the extruding speed is changed, the area B varies at a constant rate in a similar manner.

The function of the defined chamber 4 is to cause internal flow in the rubber or rubberlike material supplied in the defined chamber 4 to cause an extruded pressure which arrives at the maximum pressure as shown in FIG. 4 immediately before the mouthpiece 3.

This present adjustment function depends clearly upon the contour 14 of the mouthpiece 3, particularly the dimension thereof. Moreover, the function depends on a head of the rubber or rubberlike material in the defined chamber 4 or a height H of the material measured from the level of the contour 14 (FIG. 1). In the embodiment shown in FIG. 1, the cross-section of the defined chamber 4 for flowing the rubber material is progressively narrower in the rotating direction of the roll 1. The defined chamber may be provided with an enlarged portion in section intermediate between the mouthpiece 3 and the upper end of the defined chamber.

The above mentioned height H is suited to the control factor for realizing the extruding condition fulfilling the area B in FIG. 5. For example, after an initial amount of the rubber has been filled in the defined chamber, the supply amount of the rubber from the bank 9 is controlled by the feed roll 8 so as to be coincident with the extruded amount of the rubber at the mouthpiece 3. In this manner, a ratio of the pressure gradients shown in FIG. 5 is extruding the same rubber with 1 mm opening mouthpiece to that of 5 mm can be easily set within 4–10. A pressure gradient i at the mouthpiece corresponds to the maximum pressure $P_{max}$ in the proximity of the mouthpiece, which relation is logarithmic linear such as $P_{max} \propto i^a$, where $a=0.5-0.8$ accordingly, all that is required is to select a configuration of the defined chamber 4 such that a ratio of the maximum pressures in extruding the rubber material with 1 mm opening mouthpiece to 5 mm is within 2.0–6.3 in the same manner as above described.

The inventors have further investigated the relations between the openings of mouthpieces and the pressure gradients at the mouthpieces or the maximum pressures in the proximity of the mouthpieces in extruding rubberlike materials to find following concave surfaces of housing to be preferable.

Referring to FIG. 5, the concave surface of the housing are preferably constructed such that pressure gradients at mouthpieces in extruding a rubber like material having thickness of 1–5 mm are within a particular quadrilateral area in a graph having an ordinate in logarithm showing the pressure gradients $$\left( -\frac{dP}{dX} \right)$$

and an abscissa in logarithm showing heights mm of openings of the mouthpieces. The quadrilateral area has four corners which corresponds to pressure gradients 65 and 150 kg/cm³ at a 1 mm opening mouthpiece and 11 and 23 kg/cm³ at a 5 mm opening mouthpiece.

It is more preferable that the quadrilateral area has four corners corresponding to pressure gradients 80 and 120 kg/cm³ at the 1 mm opening mouthpiece and 14 and 19 kg/cm³ at the 5 mm opening mouthpiece. In this case, materials were used such as ASTM D 3192-83 (approximate compounding ratio: NR 100, C/B 50 and oil 0) when extruding speeds were 10–30 m/min.

Instead of the pressure gradients, the maximum pressures in the proximity of the mouthpieces may be used. The concave surfaces of the housing may be constructed such that the maximum pressures are within a quadrilateral area having four corners corresponding to the maximum pressures 33 and 86 kg/cm² in the 1 mm opening mouthpiece and the maximum pressures 8 and 26 kg/cm² in the 5 mm opening mouthpiece in a graph having an ordinate showing the pressures P kg/cm² and an abscissa showing heights mm of openings of the mouthpieces.

It is more preferable that the quadrilateral area has four corners corresponding to the maximum pressures 45 and 70 kg/cm² in the 1 mm opening mouthpiece and 13 and 20 kg/cm² in the 5 mm opening mouthpiece. In this case, materials were used such as ASTM D 3192-83 at extruding speeds 10–30 m/min.

Figure 7A:
FIGS. 7a, 7b and 7c illustrate cross-sections of extruded rubbers through the mouthpiece in FIG. 6.
Figure 7B:
Figure 7C:

In an experimental operation, an extruder was used, comprising a roll 1 having an outer diameter of 10 in (approximately 254 mm) and a housing 2 having a concaved surface 13 over one fourth of a circle having a radius of 150 mm eccentrically in opposition to the roll 1 to form a defined chamber 4 whose section progressively narrows toward a mouthpiece 3 as shown in FIGS. 1 and 2. First, the ratio of the pressure gradients at the mouthpiece in extruding a rubber material A shown in Table 1 and 1 mm opening mouthpiece to that of 5 mm was set 6.5 (the ratio of the maximum pressures 3.8) by adjusting the height H in the defined chamber 4. Thereafter, three rubber materials A, B and C were extruded at extruding speeds from 5 m/min to 30 m/min using a mouthpiece having a contour 14 as shown in FIG. 6 to obtain extruded rubbers having cross-sections as shown in FIGS. 7a, 7b and 7c.

TABLE 1

| Kind of Rubber | Polymer | Carbon | Oil |
| --- | --- | --- | --- |
| A | NR 100 | 50 | 5 |
| B | NR 50 | 65 | 10 |
|   | IIR 50 |    |    |
| C | SBR 50 | 75 | 40 |
|   | BR 50  |    |    |

NR: Natural rubber
SBR: Styrene-butadiene copolymer rubber
IIR: Isobutylene-isoprene rubber
BR: Butadiene rubber FIGS. 7a, 7b and 7c illustrate the sectional configurations of the extruded rubbers A, B and C. The same results as to the sectional configurations were obtained at extruding speeds other than the above.

Figure 8:
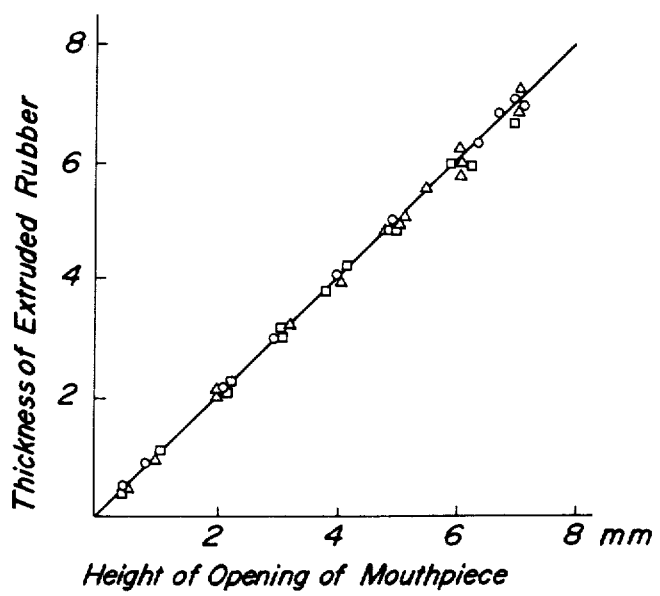
FIG. 8 is a graph showing a relation between the height of opening of mouthpiece and the thickness of extruded rubber.

FIG. 8 illustrates a relation between the height of the opening of the mouthpiece 3 and the thickness of the extruded rubbers 5'. As can be seen from FIG. 8, these values are substantially directly proportional to each other and not dependent upon the compositions of the rubbers and extruding speeds. The extruder according to the invention can avoid substantially the swells of the extruded rubbers.

Figure 9:
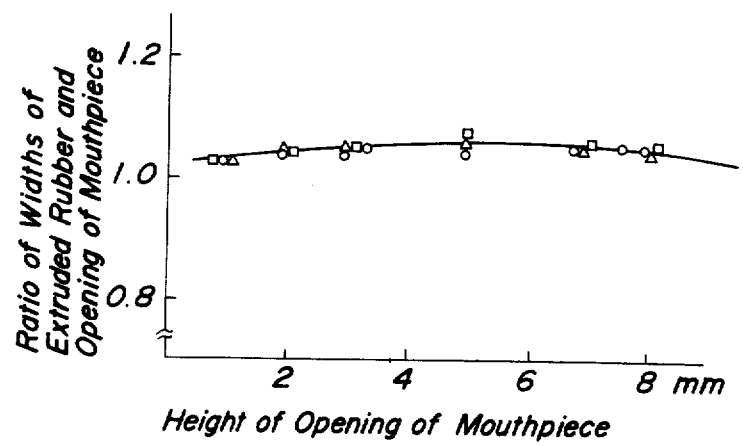
FIG. 9 is a graph illustrating a relation between with changing of the extruded rubber and the mouthpiece.
Figure 10:
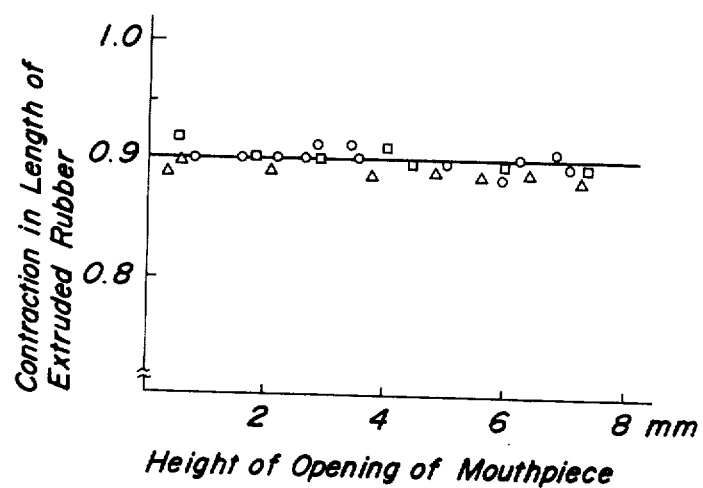
FIG. 10 is a graph showing shrinkage of the extruded rubbers in their length.

FIG. 9 illustrates the ratio of the width of extruded rubber to the width of the opening of the mouthpiece in an ordinate and the height of opening of the mouthpiece in an abscissa. The rubber materials were extruded under the same extruding conditions by changing the mouthpieces having uniform openings whose heights are 1-8 mm. The variations in the ratio of the width of extruded rubber to that of the mouthpiece within values of the order of 2-5%.

Moreover, the shrinkage in length of the extruded rubbers were of the order of 10% and substantially constant with the respective mouthpieces. The shrinkage was substantially completed in a few seconds immediately after the extrusion.

As can be seen from the results of these experiments above described, the extruded rubbers obtained by the extruder according to the invention are substantially coincident in cross-section with the contours of the mouthpieces. The shape of the mouthpiece can be very easily designed only by taking a few % extension in width into consideration irrespective of the kinds of rubber material and extruding speeds, so that the extruder according to the invention is very convenient for operation. As the extruded rubbers according to the invention substantially uniformly shrink about 10% immediately after the extrusion, irregularities in length and rise or curved portion of the extruded materials are eliminated by driving a conveyor line at a speed about 90% of a circumferential speed of the roll, to avoid any trouble in following forming process.

The extruder according to the invention is capable of extruding rubbers which in fact do not include swells and internal strains. Furthermore, the extruder is very easy to set contours of mouthpieces for extrusion, and is able to reduce informations of the extruded rubbers, and therefore need not any troublesome adjustment which is indispensable in hitherto used extruders, thereby realizing remarkable improvement of working efficiency.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A rotary roll-type rubber extruder including a roll having an outer cylindrical surface rotatively driven by driving means, a housing having a stationary concave surface spaced from and in opposition to the rotating outer cylindrical surface of said roll between a pair of sidewalls close to said outer cylindrical surface of the roll to form a define chamber with the roll, and a mouthpiece detachably secured to said housing to form a defined extruding opening with said roll at an outlet of said defined chamber, wherein said concave surface of said housing is constructed such that with a rubberlike material being supplied with the same rubberlike material to meet amounts of the material extruded from said mouthpiece under action of the atmospheric pressure at an inlet of said defined chamber opposite to said mouthpiece, pressure gradients at mouthpieces in extruding the rubberlike material having thicknesses of 1-5 mm are within a quadrilateral area having four corners, said corners corresponding to pressure gradients 65 and 150 (kg/cm$^3$) at a 1 mm opening mouthpiece and pressure gradients 11 and 23 (kg/cm$^3$) at a 5 mm opening mouthpiece in a graph having an ordinate in logarithm showing the pressure gradients $$\left( -\frac{dP}{dX} \right)$$

and an abscissa in logarithm showing heights (mm) of openings of the mouthpieces.

2. A rotary roll-type rubber extruder as set forth in claim 1, wherein a ratio of pressure gradients at the mouthpiece in extruding a rubberlike material with the 1 mm opening mouthpiece to that of 5 mm opening mouthpiece within 4-10 at the same extruding speed with the same rubberlike material.

3. A rotary roll-type rubber extruder including a roll having an outer cylindrical surface rotatively driven by driving means, a housing having a stationary concave surface spaced from and in opposition to the rotating outer cylindrical surface of said roll between a pair of sidewalls close to said outer cylindrical surface of the roll to form a defined chamber with the roll, and a mouthpiece detachably secured to said housing to form a defined extruding opening with said roll at an outlet of said defined chamber, wherein said concave surface of said housing is constructed such that with a rubberlike material being supplied with the same rubberlike material to meet amounts of the material extruded from said mouthpiece under action of the atmospheric pressure at an inlet of said defined chamber opposite to said mouthpiece, the maximum pressures in the proximity of the mouthpieces in extruding a rubberlike material having thicknesses of 1-5 mm are within a quadrilateral area having four corners, said corners corresponding to the maximum pressures 33 and 86 (kg/cm$^2$) in the proximity of a 1 mm opening mouthpiece and the maximum pressures 8 and 26 (kg/cm$^2$) in the proximity of a 5 mm opening mouthpiece in a graph having an ordinate showing the pressures P (kg/cm$^2$) and an abscissa showing heights (mm) of openings of the mouthpieces.

4. A rotary roll-type rubber extruder as set forth in claim 3, wherein a ratio of the maximum pressures in the proximity of the mouthpieces in extruding a rubberlike material with the 1 mm opening mouthpiece to that of 5 mm opening mouthpiece is within 2.0–6.3 at the same extruding speed with the same rubberlike material.

* * * * *